W. DEASON.
CANE CUTTING AND STRIPPING MACHINE.
APPLICATION FILED FEB. 10, 1913. RENEWED FEB. 14, 1916.

1,176,437.

Patented Mar. 21, 1916.
7 SHEETS—SHEET 1.

Fig. 1.

WITNESSES
J. P. Broddy
Edward Bernstein

INVENTOR
William Deason
by Chas. H. Miller
attorney

W. DEASON.
CANE CUTTING AND STRIPPING MACHINE.
APPLICATION FILED FEB. 10, 1913. RENEWED FEB. 14, 1916.

1,176,437.

Patented Mar. 21, 1916.
7 SHEETS—SHEET 2.

WITNESSES
J. P. Broddy
Edward Bernstein

INVENTOR
William Deason
by Chas. H. Fisher
attorney

W. DEASON.
CANE CUTTING AND STRIPPING MACHINE.
APPLICATION FILED FEB. 10, 1913. RENEWED FEB. 14, 1916.

1,176,437.
Patented Mar. 21, 1916.
7 SHEETS—SHEET 4.

W. DEASON.
CANE CUTTING AND STRIPPING MACHINE.
APPLICATION FILED FEB. 10, 1913. RENEWED FEB. 14, 1916.

1,176,437.

Patented Mar. 21, 1916.
7 SHEETS—SHEET 5.

WITNESSES
J. P. Broddy
Edward Bernstein

INVENTOR
William Deason
by Chas. H. Riches
Attorney

W. DEASON.
CANE CUTTING AND STRIPPING MACHINE.
APPLICATION FILED FEB. 10, 1913. RENEWED FEB. 14, 1916.

1,176,437.

Patented Mar. 21, 1916.
7 SHEETS—SHEET 6.

WITNESSES

INVENTOR

UNITED STATES PATENT OFFICE.

WILLIAM DEASON, OF ASHGROVE FARM, AYR, VIA TOWNSVILLE, QUEENSLAND, AUSTRALIA.

CANE CUTTING AND STRIPPING MACHINE.

1,176,437.  Specification of Letters Patent.  Patented Mar. 21, 1916.

Application filed February 10, 1913, Serial No. 747,404. Renewed February 14, 1916. Serial No. 78,329.

*To all whom it may concern:*

Be it known that I, WILLIAM DEASON, a subject of the King of Great Britain and Ireland, residing at Ashgrove Farm, Ayr, via Townsville, in the State of Queensland, in the Commonwealth of Australia, have invented a new and useful Cane Cutting and Stripping Machine, of which the following is a specification.

This invention relates to a portable machine for the purpose of cutting and stripping sugar cane and the like, and has been devised with the object of carrying out such operations more expeditiously than as at present.

The machine consists of a wagon having draft wheels and preferably driven by a petrol engine. The wagon has affixed to one of its longitudinal sides a peculiar shaped grating set obliquely to the cane and a pair of gatherers forming guides so that the cane will come into contact with the oblique grating. These gatherers have flaring ends and also the edges to bring cane that overhangs to one side into line with the oblique grating. The oblique grating has also a finer set of tines close to a cutter bar forming a part of said grating. On this cutter bar is a cutter and an adjustable gage bar for regulating the amount of topping to be done to the cane stalks.

One of the gatherers together with one side of the wagon forms a passage for the cane to pass through, and has located therein in a convenient position, an adjustable circular saw for cutting the cane, and when said cane is cut, it is adapted to fall into a horizontal gutter or receptacle whence it is raised by an elevator that has a radially-swinging end and is adapted to be operated in such a manner as to deliver the cane stalks singly into angular chutes each provided with a receiving gutter. The cane is then removed from the receiving gutter and pushed through a stripping device, thence onto a platform with a curved guide plate so as to place the cane stalk into a lateral position between the rows of cane ready to be gathered for the mill. Each receiving gutter has a stripper consisting of a hub having a series of expanding jaws adapted to form circular orifices through which the cane is forced. The jaws are adapted to be automatically opened to allow the cane stalk to fall out.

All of the moving mechanisms of this machine are preferably driven by a petrol engine. But in order that this invention may be clearly understood, reference will now be made to the drawings, in which:

Fig. 12, is an enlarged perspective view of a stripper; Fig. 13, is a sectional elevation thereof; and, Fig. 14, is a plan of the same.

Figure 1:
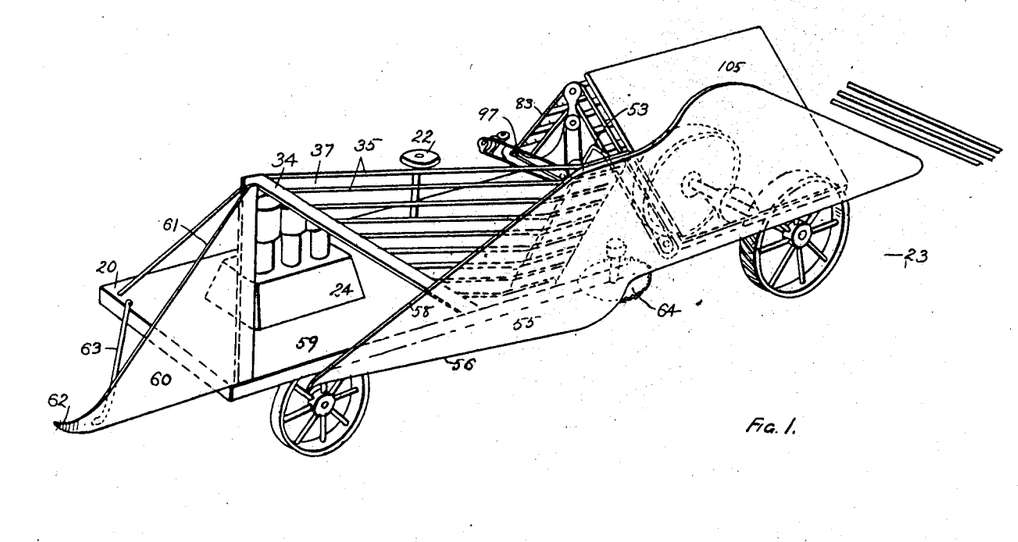
Figure 1, is a perspective view of the whole machine complete according to this invention.
Figure 2:
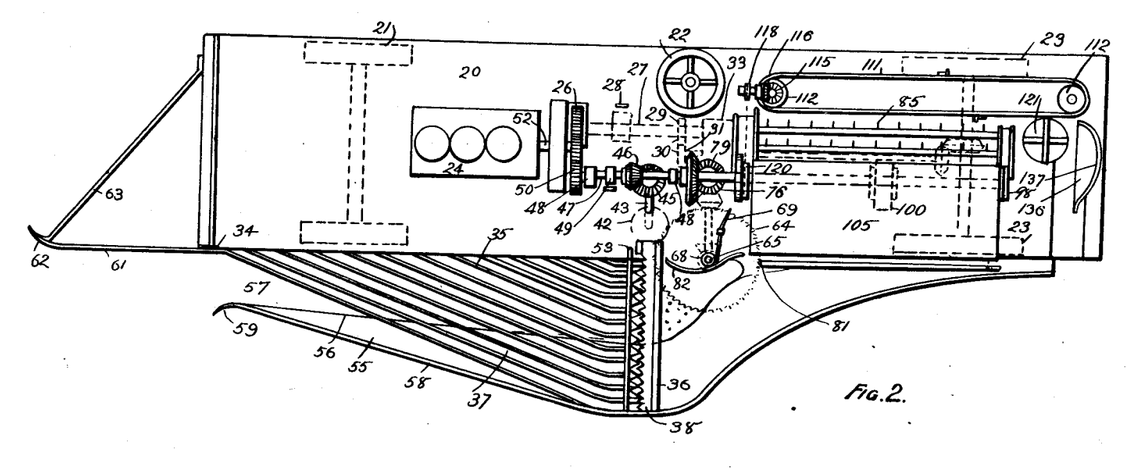
Fig. 2, is a plan thereof.

The machine consists of a wagon 20 having steering wheels 21, a steering column 22 and driving wheels 23, the latter being driven by a petrol engine 24 through means of gear wheels 25 and 26 and a shaft 27 having a clutch 28. This shaft 27 has a sprocket wheel 29 driven by a chain 30 from the sprocket wheel 31 on the shaft 32 of a gear box 33 connected to the wheels 23.

Figure 3:
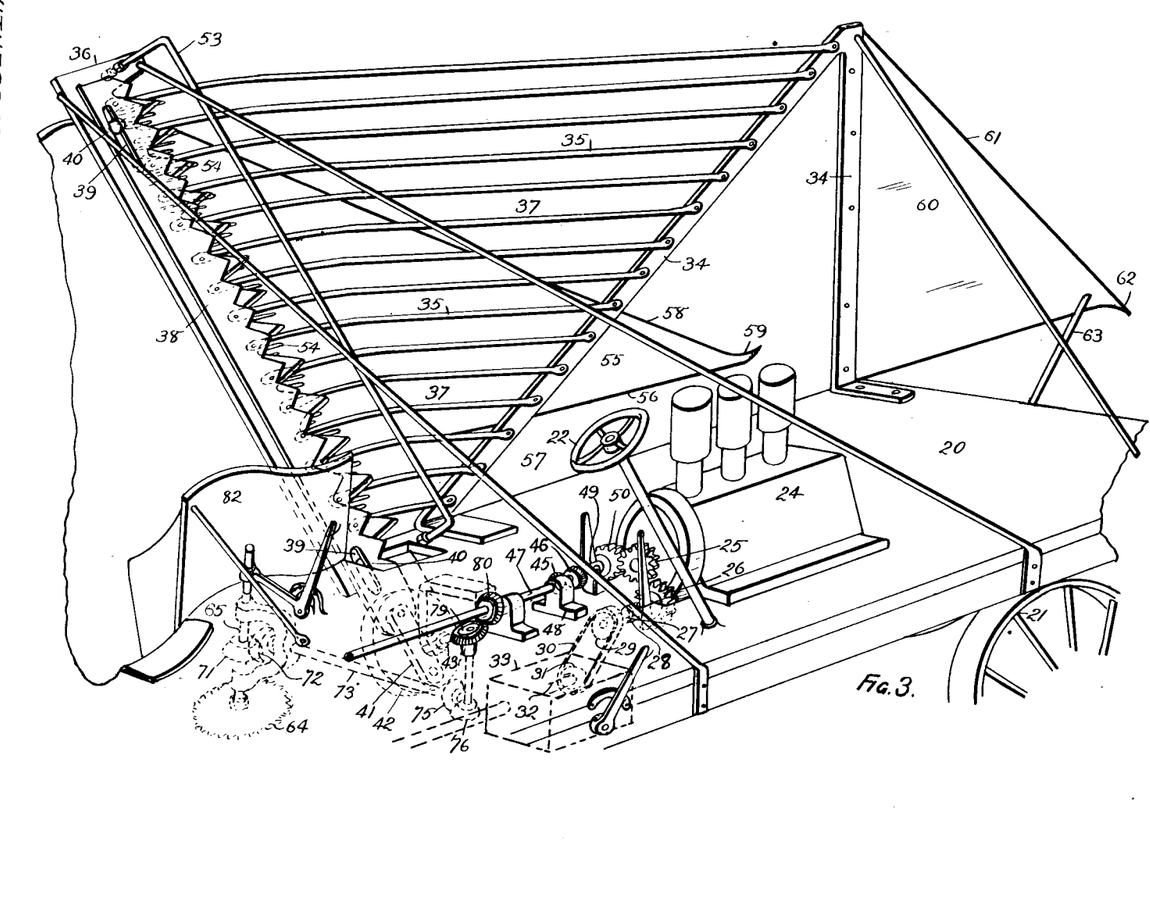
Fig. 3, is an enlarged perspective view of the fore or leading part of the machine showing the grating and topping and cutting devices.
Figures 4, 5, 6:
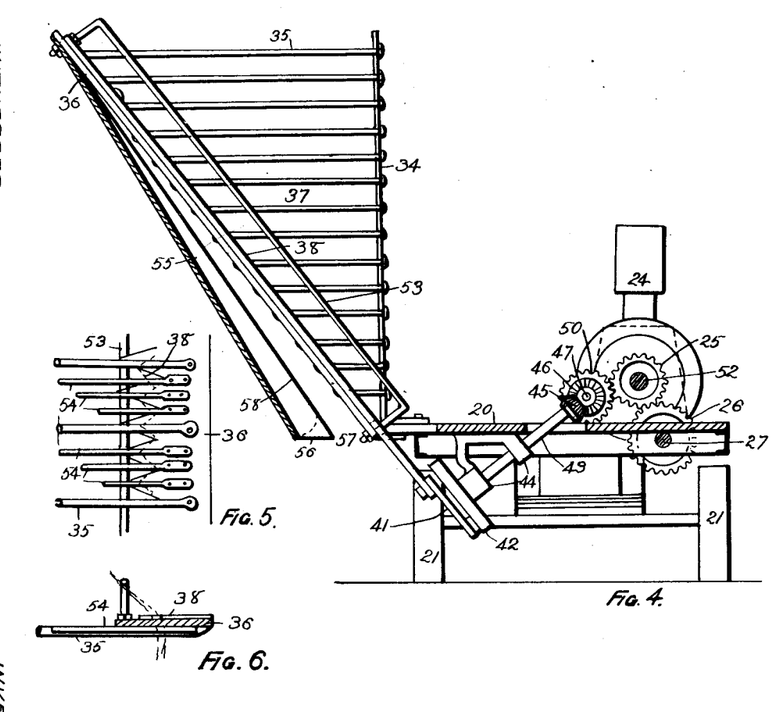
Fig. 4, is a cross sectional elevation thereof.
Fig. 5, is a bottom plan view of the cutting mechanism.
Fig. 6, is a cross section of the same.

Affixed to one side of the wagon is a vertical angular framing 34, to which are affixed horizontal bars 35. The bars 35 extend outwardly beyond the side of the wagon and are joined to an angularly overhanging member 36 affixed to said wagon and form therewith a grating. This member 36 overhangs the side of the wagon to a greater degree than the width of a row of cane, consequently the horizontal bars 35 are of different lengths and the spaces 37 between said bars are oblique to the cane and of different heights. The stalks of cane of different heights on coming into contact with this peculiar-shaped grating, are arrested and held in said spaces 37. The member 36 has angular teeth and forms a cutter bar upon which reciprocates a cutter 38 having slots 39 for guide pins 40. This cutter 38 is reciprocated by the pitman 41 from a crank disk 42 on the obliquely-set shaft 43 journaled in bearings 44. The shaft 43 is provided with a bevel gear wheel 45 meshing with a bevel gear wheel 46 on the counter shaft 47 journaled in bearings 48. This counter shaft 47 has a clutch 49 and pinion wheel 50 meshing with a gear wheel 25 on the engine shaft 52. Above and forwardly of the cutter 38 is a gage bar 53 affixed to the cutter bar 36 to regulate the height at which the cane is to be topped. Below the cutter bar 36 and between the bars 35 are sets of tines 54 which are stepped as shown (see Fig. 5), so as to prevent the cane from slipping away from the cutter bar 36.

Affixed to the cutter bar 36 and to the bottom wagon 20 is a pointed gatherer 55, the bottom longitudinal edge 56 of which, together with the edge of the wagon 20, forms a passage 57 for the cane, said gatherer 55 having an angular edge 58 oblique to the row of cane and having a flaring end 59 to insure the stalks of cane that overhang to one side entering into the spaces 37 of the grating. Attached to the framing 34 is another gatherer 60 having an angular edge 61 and flaring end 62, said gatherer 60 being braced to the wagon 20 by a diagonal stay 63, this gatherer 60 fulfilling the same purpose as the gatherer 55 hereinbefore described.

Figure 7:
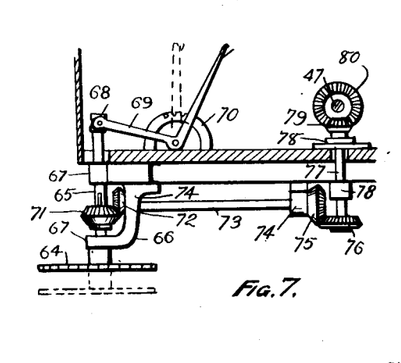
Fig. 7, is a cross sectional elevation showing the stalk cutter.
Figures 8, 9:
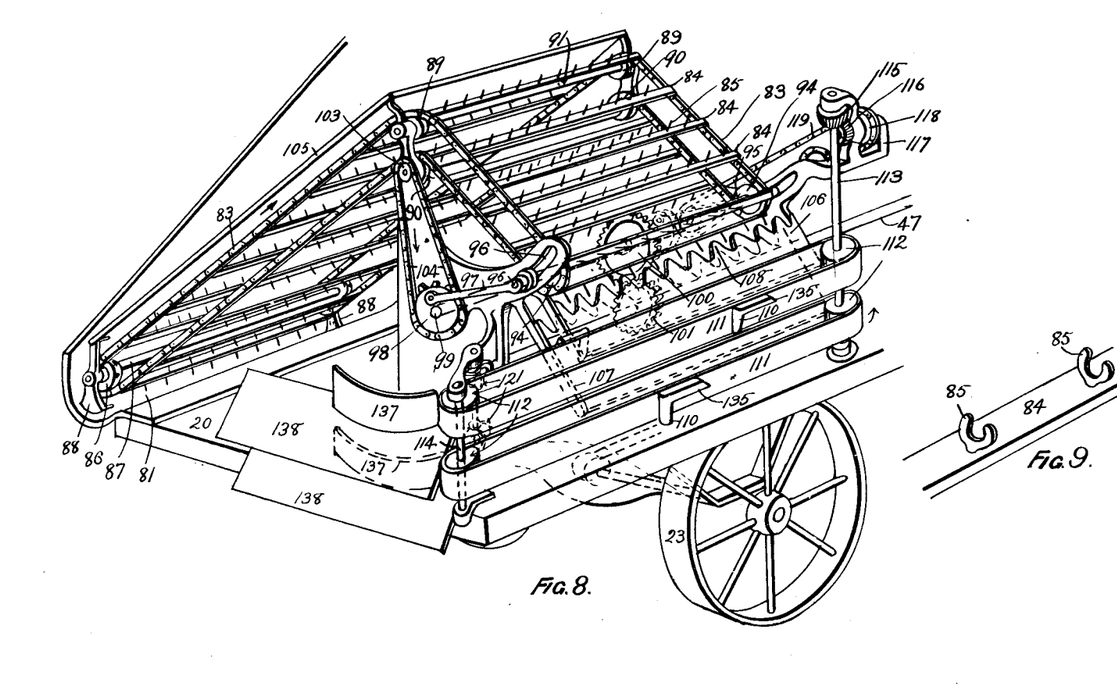
Fig. 8, is a perspective view of the rear portion of the machine showing the elevator and stripping devices.
Fig. 9, is an enlarged detail perspective view of the chain belt hooks.
Figure 10:
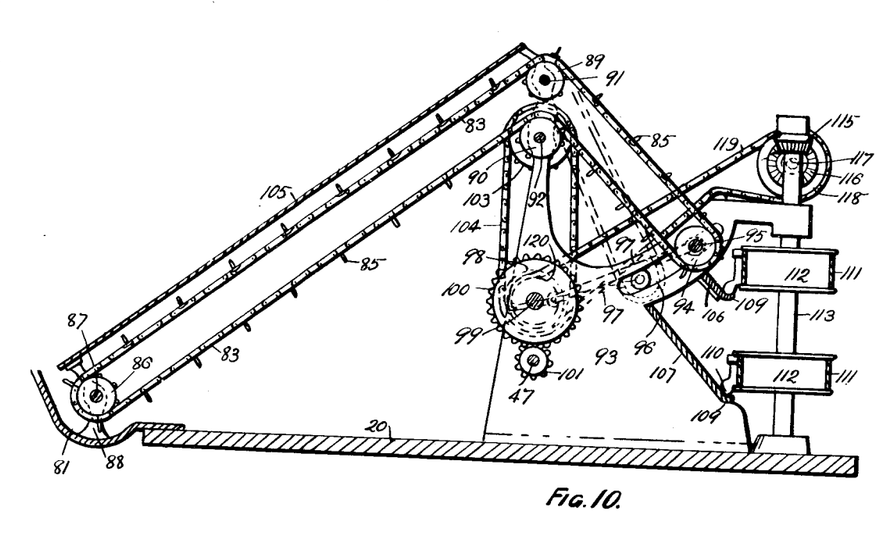
Figs. 10 and 11, are cross sectional elevations of Fig. 8.

Behind the cutter bar 36 and in the passage 57 is a circular saw 64 keyed to the vertical spindle 65 having bearings in the bracket 66 affixed to the wagon 20. The spindle 65 is vertically slidable in the bearings 67 and has a collar 68 for engagement by the bell crank lever 69, by which it is raised and lowered to bring the saw 64 to the desired height and thus regulate the height at which the cane stalks are to be cut above the ground, the bell crank lever 69 engaging with a sector 70 to hold the spindle 65 in its set position. This spindle 65 is slidable through a bevel gear wheel 71 meshing with a bevel gear wheel 72 fixed on the horizontal shaft 73 journaled in bearings 74, and fixed on the shaft 73 is another bevel gear wheel 75 meshing with the bevel gear wheel 76 fixed on the vertical spindle 77 journaled in bearings 78, the spindle 77 having a bevel gear wheel 79 meshing with a bevel gear wheel 80 on the counter shaft 47 hereinbefore mentioned. Rearwardly of this circular saw 64 is a gutter 81 formed by the extension of the gatherer 55, into which falls the cane cut by the circular saw 64, the cut cane being prevented from falling in any other direction by the shield 82. Leading from this gutter 81 is an endless chain belt 83 having lateral bars 84 provided with teeth 85 hooked shaped as shown in Fig. 9. The chain belt 83 passes over sprocket wheels 86 on a shaft 87 journaled in bearing brackets 88 in the gutter 81 and over sprocket wheels 89 and 90 on shafts 91 and 92, respectively journaled in the brackets 93 and again over a further pair of sprockets 94 on a shaft 95 movable in the sector slots 96 in the brackets 93. This shaft 95 is reciprocated by the connecting links 97 of a pair of sprocket toothed crank disks 98 on a shaft 99 having bearings in the brackets 93, and on the shaft 99 is a gear wheel 100 meshing with a gear wheel 101 on the shaft 47; thus the delivery end of the endless chain belt 83 is given a swinging motion for the purpose hereinafter to be referred to. This endless chain belt 83 is driven by the shaft 92 having a sprocket wheel 103 for the chain 104 taking around one of the sprocket toothed crank disks 98. Above the endless chain belt 83 is a shield 105 which guides the falling cane into the gutter 81.

Below the delivery end of the endless chain belt 83 are two or more angular receiving chutes 106 and 107 having the top edges 108 toothed so that the tines or teeth 85 will pass through the spaces between the teeth 108, said teeth being adapted to release the cane stalk from the tines or teeth 85. These chutes 106 and 107 end in gutters 109, into which a stalk of cane falls, said gutters being above one another. Taking into these gutters 109 are projections 110 affixed to the endless belts 111 traveling around the rollers 112 mounted on the vertical spindles 113 and 114, the former of which has a bevel gear wheel 115 meshing with the bevel gear wheel 116 on a counter shaft 117 having a sprocket 118 driven by a chain 119 from the sprocket 120 on the shaft 99 hereinbefore mentioned.

Figure 11:
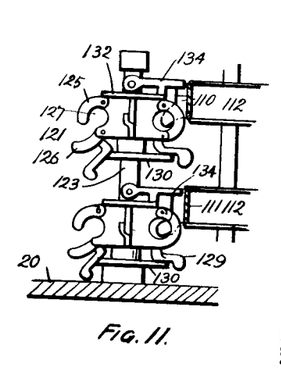
Figures 12, 13, 14:
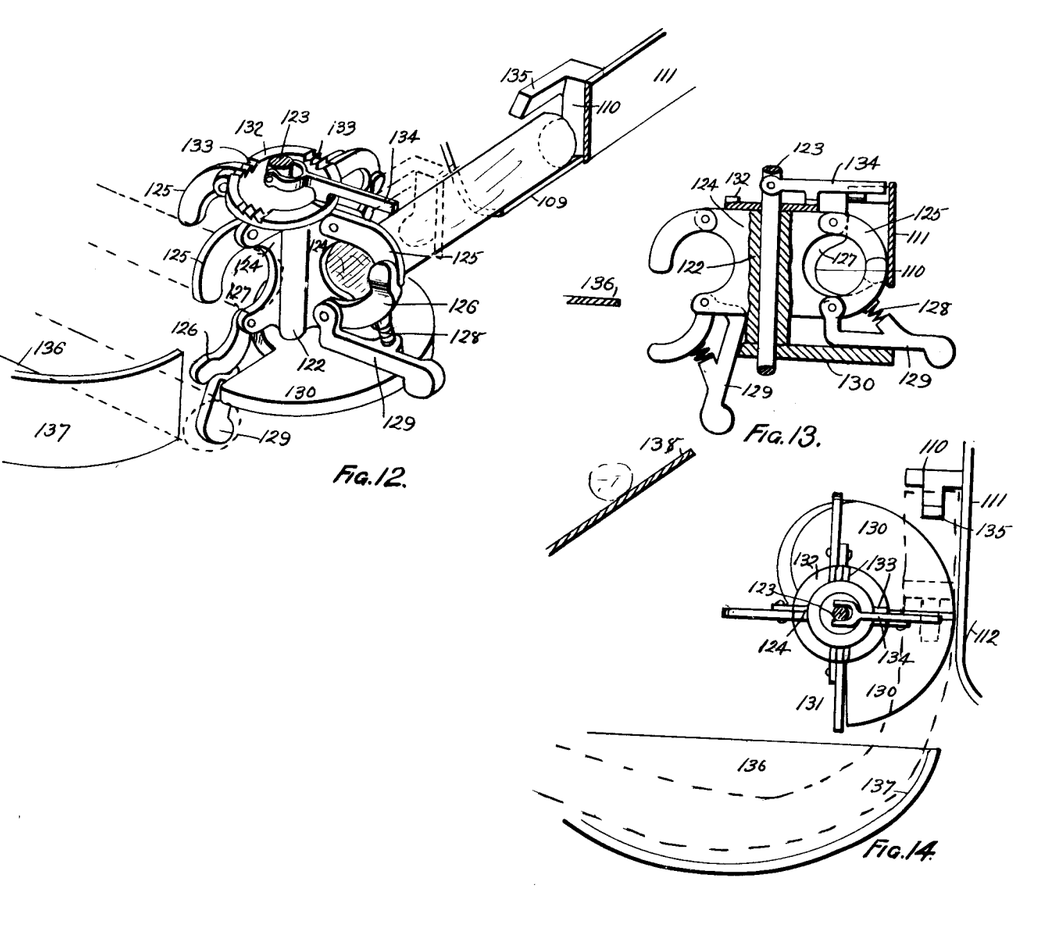

At the end of each gutter is stripping device 121 (see Fig. 11) consisting of a hub 122 rotatable upon a fixed spindle 123 secured to the wagon 20. This hub 122 has series of radial arms 124 to which are pivoted the top and bottom curved jaws 125 and 126 respectively. These jaws 125 and 126 overlap one another and form an expansible circular orifice 127 through which the stalks of cane are forced so as to be stripped of the trash.

The lower jaws 126 rest upon a spring 128 on a radial trigger arm 129, which is also pivoted to the arm 124 and is movable upon the horizontal cam 130 rigidly affixed to the spindle 123. This cam 130 has a recess 131 so that the radial trigger 129, on falling, lowers the jaw 126, thus opening the orifice 127 and allowing the cane to fall out after having been stripped of the trash.

While the cane is being forced through the orifice 127, the hub 122 is locked in position by a crown wheel 132 partially toothed as at 133, into which takes a pawl, pivoted to the fixed spindle 123. This pawl 134 is adapted to be operated by the fingers 135 on the endless belts 111 set at arbitrary lengths. The stalk of cane, when forced through the orifice 127, passes onto a platform 136 having a curved guiding plate 137 which causes the stalk of cane to take up a lateral position. Below these platforms 136 are delivery chutes 138.

In operation, as the machine proceeds along, the cane is guided into the passage 57 by the gatherers 55 and 61. The gatherer 55 forces the different heights of cane into their respective spaces 37 of the grating and against the gage 53 which causes the stalks to bend backward between said gage 53 and the cutter bar 36 (see Fig. 6) and take between the finer set of tines. The tops of the canes are then severed obliquely by the cutter 38, which is reciprocated by the crank disk 42 of the shaft 43, gear wheels 45 and 46, and shaft 47 clutched to the gear wheel 25 on the engine shaft 52. As the machine moves ahead, the cane stalks are cut by the circular saw 64 rotated by the gear wheels 71 and 72, shaft 73, gear wheels 75 and 76, vertical shaft 77, gear wheels 79 and 80 and shaft 47. The cut cane then falls into the gutter 81.

The endless chain belt 83 receives motion from the sprockets 90 on the shaft 92, the shaft 92 being driven by the sprocket wheel 103, chain belt 104 and sprocket wheel 98 on the shaft 99. This shaft 99 is geared to the shaft 47 by gear wheels 100 and 101, and the shaft 47 is driven by the engine. Each bar 84 with its hooks 85 lifts a single stalk of cane, which it deposits into one or other of the chutes 106 or 107, according to the position of the delivery end of the chain belt 83, which is swung to and fro by the crank disk 98 on the shaft 99.

The cane, when in the gutter 109, is forced by the projection 110 on the belt 111 through the orifice 127 which cleans off the trash, and when the cane is nearly through the orifice, the fingers 135 will lift the pawl 134 and allow the hub 122 to rotate, the projection 110 then forcing it around. The cane meanwhile passes onto the platform 136 and is forced into a lateral position by the curved guiding plate 137 until the release position of the jaws 125 and 126 is reached, when the trigger 129, falling into the recess 131 of the cam, allows the jaws 125 and 126 to open and permits the stalk of cane to fall down the chute 138 to the ground.

The belts 111 are driven by the pulleys 112 on the spindle 113 operated by the gear wheels 115 and 116, shaft 117, sprocket 118, chain belt 119 and sprocket 120 on the shaft 99 geared to the engine-driven shaft 47.

Having thus fully described the nature of my invention, what I claim as new and desire to secure by Letters Patent, is:—

1. A cane cutting and stripping machine comprising a carriage, a grating obliquely set to the carriage to overhang the rows of cane, a set of stepped tines between each adjacent pair of bars of said grating, and a gatherer fixed to said grating and forming with the carriage a passage for the cane and having a flaring end to insure the overhanging cane stalks entering the spaces of the grating.

2. A cane cutting and stripping machine comprising a carriage, a grating obliquely set to the carriage to overhang the rows of cane, a set of stepped tines between each adjacent pair of bars of said grating, and a gatherer fixed to said grating and forming with the carriage a passage for the cane and having a flaring end to insure the overhanging cane stalks entering the spaces of the grating, in combination with a cutter reciprocating on said grating.

3. A cane cutting and stripping machine comprising a carriage, a grating obliquely set to the carriage to overhang the rows of cane, a set of stepped tines between each adjacent pair of bars of said grating, and a gatherer fixed to said grating and forming with the carriage a passage for the cane and having a flaring end to insure the overhanging cane stalks entering the spaces of the grating, said gatherer having a channeled extension in rear of said cutter into which the cut cane falls, in combination with a cutter for severing the tops, and means in rear of the cutter for severing the stalks, of the cane.

4. A cane cutting and stripping machine comprising a carriage, a grating obliquely set to the carriage to overhang the rows of cane, a set of stepped tines between each adjacent pair of bars of said grating, and a gatherer fixed to said grating and forming with the carriage a passage for the cane and having a flaring end to insure the overhanging cane stalks entering the spaces of the grating, in combination with a cutter, reciprocating on said grating to sever the tops from the canes, a saw in rear of said cutter to sever the stalks, said gatherer having a channeled extension in rear of said saw into which the cut cane falls, and a conveyer belt to remove the cut cane from said channeled extension.

5. A cane cutting and stripping machine comprising a carriage, a grating obliquely set to the carriage to overhang the rows of cane, a set of stepped tines between each adjacent pair of bars of said grating, and a gatherer fixed to said grating and forming with the carriage a passage for the cane and having a flaring end to insure the overhanging cane stalks entering the spaces of the grating, in combination with a cutter, reciprocating on said grating to sever the tops from the canes, a saw in rear of said cutter to sever the stalks, said gatherer having a channeled extension in rear of said saw into which the cut cane falls, a conveyer belt to remove the cut cane from said channeled extension, and means for imparting an oscillating movement to the delivery end of said belt.

6. A cane cutting and stripping machine comprising a carriage, a grating obliquely set to the carriage to overhang the rows of cane, a set of stepped tines between each adjacent pair of bars of said grating, and a gatherer fixed to said grating and forming with the carriage a passage for the cane and having a flaring end to insure the overhanging cane stalks entering the spaces of the grating, in combination with a cutter, reciprocating on said grating to sever the tops from the canes, a saw in rear of said cutter to sever the stalks, said gatherer having a channeled extension in rear of said saw into which the cut cane falls, a conveyer belt to remove the cut cane from said channeled extension, means for imparting an oscillating movement to the delivery end of said belt, a plural number of chutes opposed to the end of the conveyer belt, and a conveyer belt for each chute operating to remove the cane stalks therefrom.

7. A cane cutting and stripping machine comprising a carriage, a grating obliquely set to the carriage to overhang the rows of cane, a set of stepped tines between each adjacent pair of bars of said grating, and a gatherer fixed to said grating and forming with the carriage a passage for the cane and having a flaring end to insure the overhanging cane stalks entering the spaces of the grating, in combination with a cutter, reciprocating on said grating to sever the tops from the canes, a saw in rear of said cutter to sever the stalks, said gatherer having a channeled extension in rear of said saw, into which the cut cane falls, a conveyer belt to remove the cut cane from said channeled extension, means for imparting an oscillating movement to the delivery end of said belt, a plural number of chutes opposed to the end of the conveyer belt, a conveyer belt for each chute operating to remove the cane stalks therefrom, and a stripping device for each chute.

WILLIAM DEASON.

Witnesses:
T. C. ALLEN, Jr.,
HILDA GAUDET.